United States Patent [19]

Tokumaru et al.

[11] Patent Number: 4,839,839
[45] Date of Patent: Jun. 13, 1989

[54] BARREL SHIFTER INCLUDING ROTATE OPERATION

[75] Inventors: Takeji Tokumaru; Miyuki Nagata, both of Yokohama, Japan

[73] Assignee: Kabushiki Kaisha Toshiba, Kawasaki, Japan

[21] Appl. No.: 101,640

[22] Filed: Sep. 28, 1987

[30] Foreign Application Priority Data

Sep. 26, 1986 [JP] Japan .................. 61-226220

[51] Int. Cl.$^4$ .................. G06F 7/00
[52] U.S. Cl. .................. 364/715.08; 364/900
[58] Field of Search .................. 364/715, 900, 715.08

[56] References Cited

U.S. PATENT DOCUMENTS

| 3,961,750 | 6/1976 | Dao | 364/715 X |
|---|---|---|---|
| 4,345,316 | 8/1982 | Hirotani et al. | 364/900 |
| 4,383,304 | 5/1983 | Hirashima | 364/715 |
| 4,396,994 | 8/1983 | Kang et al. | 364/900 |
| 4,472,788 | 9/1984 | Yamazaki | 364/900 |
| 4,583,197 | 4/1986 | Chappell et al. | 364/900 |

Primary Examiner—Gary V. Harkcom
Assistant Examiner—Tan V. Mai
Attorney, Agent, or Firm—Foley & Lardner, Schwartz, Jeffery, Schwaab, Mack, Blumenthal & Evans

[57] ABSTRACT

Where an N-bit input data is rotated together with a carry bit by an N-bit or more rotate count, the actual rotate count is obtained as a remainder or modulo of $x/N+1$ (x: rotate count; N: data bit length). The above remainder will not be obtained by simply masking shift signals. Therefore, the remainder is calculated at high speed through hardware including a subtrahend calculator section for calculating $(N+1)(i)$ $(i=0, 1, 2, ...)$ and a subtracter section for calculating $\{x-(N+1)(i)\}$ to obtain a modulo or a remainder representative of an actual rotate count.

7 Claims, 7 Drawing Sheets

SHIFT SECTION

F I G. 4

ROTATE WITHOUT CARRY

| INPUT DATA BIT LENGTH (N) | ACTUAL SHIFT COUNT(MODULO X/N) | SHIFT SIGNALS | | | | DIVISOR(N) |
|---|---|---|---|---|---|---|
| | | S16 | S8 | S4 | S2 S1 | |
| 4 bit | 0~3 | 0 | 0 | 0 | * * | 4 |
| 8 bit | 0~7 | 0 | 0 | * | * * | 8 |
| 16 bit | 0~15 | 0 | * | * | * * | 16 |
| 32 bit | 0~31 | * | * | * | * * | 32 |

NOTE ) 0 INDICATES MASKED BITS
\* INDICATES ROTATE COUNT BITS

SHIFT COUNT CALCULATING SEC FOR 32-BIT SHIFTER

FIG. 7
ROTATE WITH CARRY

| DECIMAL SHIFT COUNT | ROTATE COUNT INDICATING LINES | | | | | 8-BIT INPUT | | 16-BIT INPUT | |
|---|---|---|---|---|---|---|---|---|---|
| | L16 | L8 | L4 | L2 | L1 | SUBTRAHEND | DETECTION SIG | SUBTRAHEND | DETECTION SIG |
| 0 | 0 | 0 | 0 | 0 | 0 | 0 | — | 0 | — |
| 1 | 0 | 0 | 0 | 0 | 1 | 0 | — | 0 | — |
| 2 | 0 | 0 | 0 | 1 | 0 | 0 | — | 0 | — |
| 3 | 0 | 0 | 0 | 1 | 1 | 0 | — | 0 | — |
| 4 | 0 | 0 | 1 | 0 | 0 | 0 | — | 0 | — |
| 5 | 0 | 0 | 1 | 0 | 1 | 0 | — | 0 | — |
| 6 | 0 | 0 | 1 | 1 | 0 | 0 | — | 0 | — |
| 7 | 0 | 0 | 1 | 1 | 1 | 0 | — | 0 | — |
| 8 | 0 | 1 | 0 | 0 | 0 | 0 | — | 0 | — |
| 9 | 0 | 1 | 0 | 0 | 1 | 9 | SB1 | 0 | — |
| 10 | 0 | 1 | 0 | 1 | 0 | 9 | ″ | 0 | — |
| 11 | 0 | 1 | 0 | 1 | 1 | 9 | ″ | 0 | — |
| 12 | 0 | 1 | 1 | 0 | 0 | 9 | ″ | 0 | — |
| 13 | 0 | 1 | 1 | 0 | 1 | 9 | ″ | 0 | — |
| 14 | 0 | 1 | 1 | 1 | 0 | 9 | ″ | 0 | — |
| 15 | 0 | 1 | 1 | 1 | 1 | 9 | ″ | 0 | — |
| 16 | 1 | 0 | 0 | 0 | 0 | 9 | ″ | 0 | — |
| 17 | 1 | 0 | 0 | 0 | 1 | 9 | ″ | 17 | SW1 |
| 18 | 1 | 0 | 0 | 1 | 0 | 18 | SB2 | 17 | ″ |
| 19 | 1 | 0 | 0 | 1 | 1 | 18 | ″ | 17 | ″ |
| 20 | 1 | 0 | 1 | 0 | 0 | 18 | ″ | 17 | ″ |
| 21 | 1 | 0 | 1 | 0 | 1 | 18 | ″ | 17 | ″ |
| 22 | 1 | 0 | 1 | 1 | 0 | 18 | ″ | 17 | ″ |
| 23 | 1 | 0 | 1 | 1 | 1 | 18 | ″ | 17 | ″ |
| 24 | 1 | 1 | 0 | 0 | 0 | 18 | ″ | 17 | ″ |
| 25 | 1 | 1 | 0 | 0 | 1 | 18 | ″ | 17 | ″ |
| 26 | 1 | 1 | 0 | 1 | 0 | 18 | ″ | 17 | ″ |
| 27 | 1 | 1 | 0 | 1 | 1 | 27 | SB3 | 17 | ″ |
| 28 | 1 | 1 | 1 | 0 | 0 | 27 | ″ | 17 | ″ |
| 29 | 1 | 1 | 1 | 0 | 1 | 27 | ″ | 17 | ″ |
| 30 | 1 | 1 | 1 | 1 | 0 | 27 | ″ | 17 | ″ |
| 31 | 1 | 1 | 1 | 1 | 1 | 27 | ″ | 17 | ″ |

BARREL SHIFTER INCLUDING ROTATE OPERATION

BACKGROUND OF THE INVENTION

1. Field of the Invention

The present invention relates to a barrel shifter which can implement a carry-including rotate operation at a high speed by calculating the amount of shift in dependence upon a hardware configuration, without depending upon software.

2. Description of the Prior Art

The carry-bit including rotation operation such that information is circulated together with a carry bit by unit of bits can be implemented by a barrel shifter. In the conventional barrel shifter, the carry-including rotation operation has been executed in accordance with microprogram by the aid of a register, so that there exists a problem in that the execution time is relatively long. To overcome this problem, the same inventors have co-filed U.S. patent application Ser. No. 07/102,343, entitled "Highly Responsive Barrel Shifter", on Sept., 29, 1987, by which an input data can be rotated at high speed together with a carry bit by means of only hardware (logic gates).

In this novel barrel shifter, however, there still exists a problem such that it is impossible to implement carry-excluding rotation operation or carry-including rotation operation in response to shift signals indicative of shift counts where an N-bit or less input data is given to an N-bit barrel shifter and further an N-bit or more shift count is instructed.

This is because in a rotation operation, any input data should periodically be repeated according to bit length of the input data, irrespective of the amount of rotate (referred to as rotate count). That is, in the rotation operation of an N-bit length input data, the rotated data are always the same at each rotation operation. In other words, if the rotate count is designated as x, a remainder (referred to as modulo x/N) of a division x/N becomes an actual rotate count.

However, when an N-bit or less input data is rotated together with a carry by an N-bit or more rotate count, since the modulo changes to modulo x/N+1, it is impossible to implement carry-including rotation operation by simply masking shift signals, as described later in greater detail. Therefore, the shift count or the modulo x/N+1 should be calculated in order to implement a carry-including rotation operation whenever an N-bit or less data is rotated together with a carry by an N-bit or more rotate count.

The above shift or rotate signal calculation may be executed in accordance with software. However, it takes a relatively long execution time.

The configuration and operation of this co-filled barrel shifter will be described in greater detail hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide a barrel shifter which can implement a carry-including rotation operation at a high speed by calculating the amount of shift on the basis of the input data bit length N and the amount of rotation x by means of hardware (without depending upon software), when x exceeds N.

To achieve the above-mentioned object, the barrel shifter according to the present invention comprises: (a) shifting means for selectively shifting an N-bit input data by a given shift count in response to a plurality of shift signals indicative of a shift count in combination and outputting a 2N-bit output data; (b) ANDing means connected to said shifting means for ANDing a carry signal and a carry rotate signal to insert a carry bit behind a least significant bit position of the shifted N-bit output in cooperation with the shift signals; (c) ORing means connected to said shifting means for finding logical sums of each of N lower significant bits of the 2N-bit output data and each of N higher significant bits of the same in response to a rotate signal to obtain an N-bit rotated data without carry and logical sums of each of N lower significant bits of the 2N-bit output data and each of (N-1) higher significant bits of the same in response to a carry rotate signal to obtain an N-bit rotated data with carry; and (d) calculating means for calculating an actual shift count in accordance with a formula of $x-(N+1)$ (i) ($i=0,1,2,\ldots$) where x denotes a rotate count and N denotes an input data bit length, when the rotate count x is more than the input data bit length N, and for outputting the calculated shift signals to rotate the N-bit data with carry by a rotate count more than the input data bit length N.

The calculating means comprises: (a) subtrahend calculating means for calculating a subtrahend on the basis of a rotate count and in response to a carry rotate signal and an input data bit length signal; and (b) subtracting means for subtracting the calculated subtrahend from the rotate count and for outputting shift signals corresponding thereto.

In the barrel shifter according to the present invention, in the case where an N-bit input data is rotated together with a carry bit by a rotate count x more than N-bits, since the shift count is determined by calculating a modulo $x/N+1$ or remainder of a division $x/N+1$ by means of hardware, it is possible to provide a barrel shifter which can effect high-speed carry-including rotation operation. Further, an N-bit data rotated together with a carry bit can be obtained by first shifting an input data on the basis of the calculated shift count and then by finding logical sums of each of N lower significant bits of the 2N-bit output data and each of (N-1) higher significant bits of the same in response to a carry rotate signal.

BRIEF DESCRIPTION OF THE DRAWINGS

The features and advantages of the barrel shifter according to the present invention will be more clearly appreciated from the following description taken in conjunction with the accompanying drawings in which:

FIG. 4 is a table for assistance in explaining the relationship between input data bit length N, shift count (modulo x/N), shift signals, and divisor (N) in carry-excluding rotation operation;

FIG. 7 is a table showing calculation results obtained by the shift count calculating section shown in FIG. 6.

DETAILED DESCRIPTION OF THE PREFERRED EMBODIMENT

To facilitate understanding of the present invention, a reference will be made to a barrel shifter related to the present invention and co-filed at the same date by the same inventors, with reference to the attached drawings.

Figure 1:
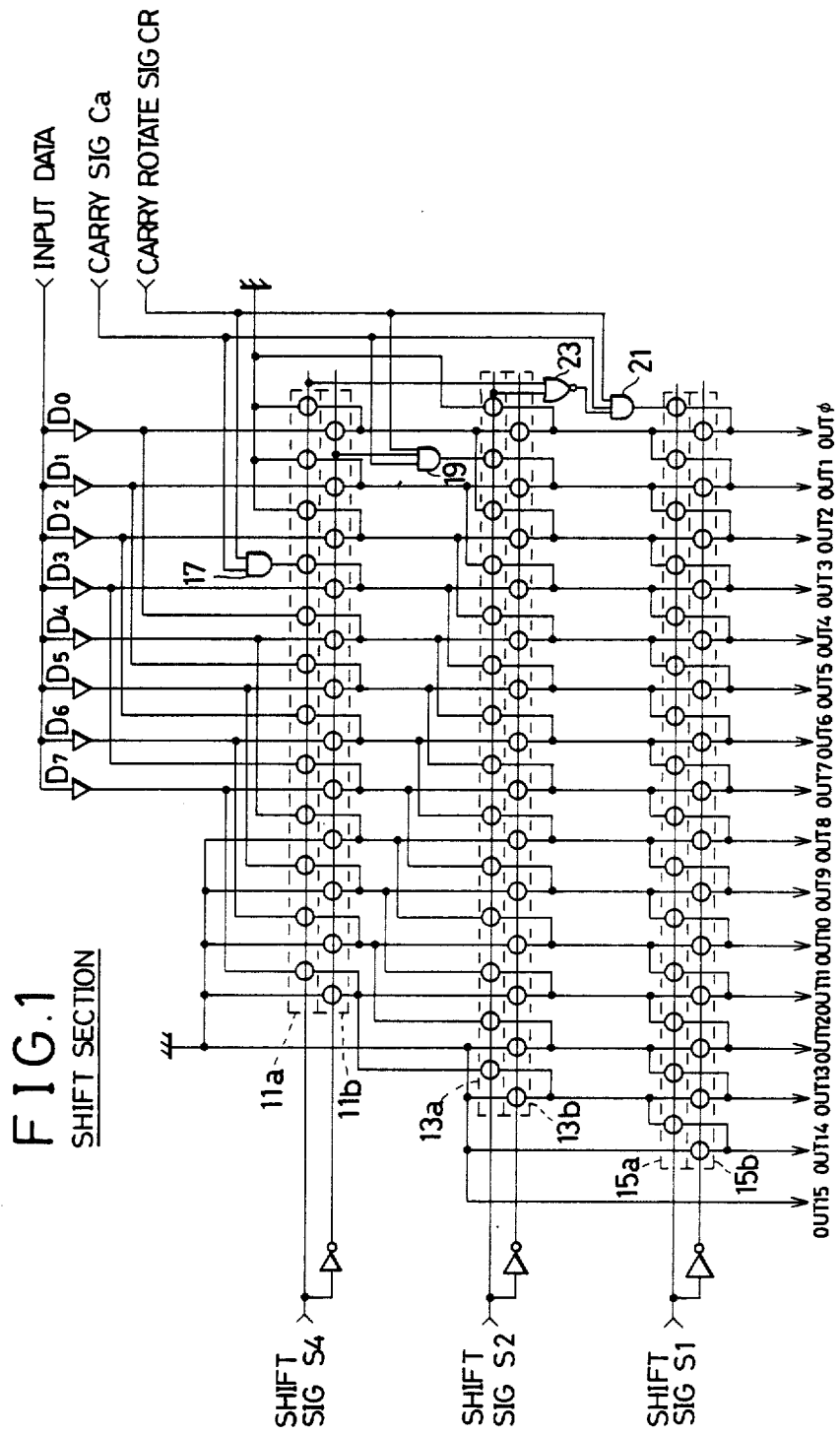
FIG. 1 is a schematic block diagram of a shift section of a co-filled barrel shifter according to the present invention.
Figure 2:
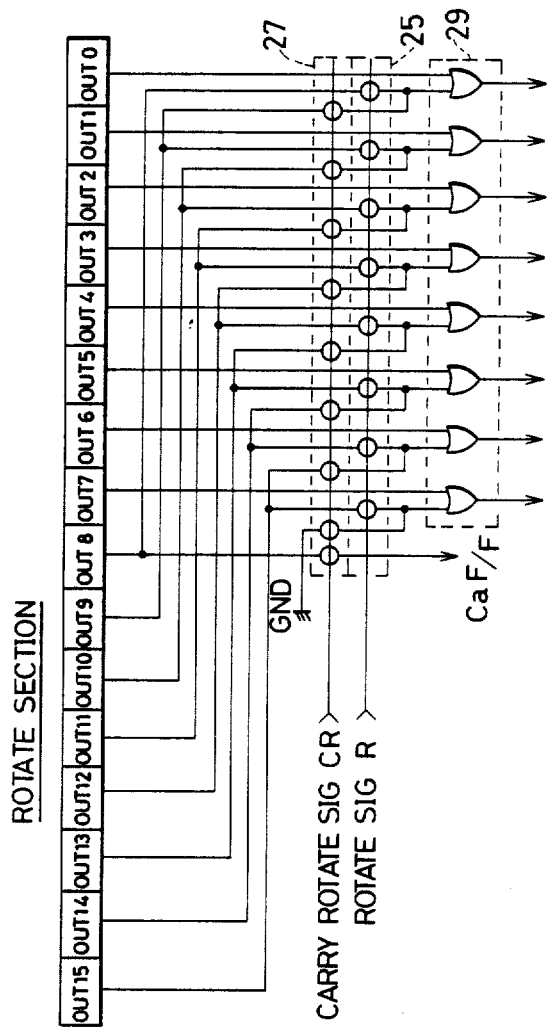
FIG. 2 is a schematic block diagram of a rotate section of the co-filled barrel shifter.

FIGS. 1 and 2 are diagrams for showing a barrel shifter for implementing a rotation operation such that input data is circulated together with a carry bit by unit of bits (referred to as carry-including rotation operation), in which FIG. 1 shows a shift section thereof and FIG. 2 shows a rotate section thereof.

This barrel shifter shown in FIGS. 1 and 2 implements a carry-excluding rotation operation or a carry-including rotation operation of an 8-bit input data ($D_0$ to $D_7$). The shift section shown in FIG. 1 shifts an 8-bit input data ($D_0$ to $D_7$) by 0 to $-7$-bit shift count in the higher significant bit direction (referred to as the leftward direction), and inserts a carry bit Ca behind the least significant bit of the shifted data. On the other hand, the rotate section shown in FIG. 2 rotates the input data shifted through the shift section.

The shift section includes a plurality of selectors 11a, 11b, 13a, 13b, 15a and 15b and a plurality of AND gates 17, 19 and 21. These selectors shift an input data $D_0$ to $D_7$ by a predetermined shift count in response to shift signals $S_1$, $S_2$ and $S_4$, and output a shifted data through output terminals OUT 0 to OUT 15. These AND gates enter a carry Ca to a digit position just behind the least significant bit $D_0$ of a shifted input data $D_0$ to $D_7$.

The selector 11a changes to a conductive state when the shift signal $S_4$ changes to "1" level, in order to shift an input data $D_0$ to $D_7$ by 4-bits in the leftward direction. The selector 13a changes to a conductive status when the shift signal $S_2$ changes to "1" level, in order to shift an input data applied to the selector 13a by 2 bits in the leftward direction. The selector 15a changes to a conductive status when the shift signal $S_1$ changes to "1" level, in order to shift an input data applied to the selector 15a by 1 bit in the leftward direction. The input data $D_0$ to $D_7$ thus shifted is outputted through output terminal OUT 0 to OUT 7 and OUT 8 to OUT 15. In contrast with this, the selectors 11b, 13b and 15b change to a conductive status, respectively when each of the shift signals $S_4$, $S_2$ and $S_1$ changes to "0" level. In this status, the input data applied to each of these selectors is not shifted but directly outputted as it is.

Accordingly, the input data $D_0$ to $D_7$ can be shifted in the leftward direction within a range of 0 to 7 bits according to various combinations of voltage levels ("1" or "0") of these shift signals $S_1$, $S_2$ and $S_4$, before being outputted through the output terminal OUT 0 to OUT 7, out OUT 8 to OUT 15.

On the other hand, the AND gates 17, 19 and 21 insert a carry bit Ca to a position just behind the least significant bit $D_0$ of the shifted data $D_0$ to $D_7$, when a carry rotate signal CR changes to "1" level to implement a carry-including rotation operation. That is, when the shift signal $S_4$ changes to "1" level, a carry Ca is inserted to the data applied to the selector 11a through the AND gate 17, irrespective of the levels of the shift signals $S_2$ and $S_1$. When the shift signal $S_4$ changes to "0" level and the shift signal $S_2$ changes to "1" level, a carry bit Ca is inserted to the data applied to the selector 13a through the AND gate 19, irrespective of the level of the shift signal $S_1$. When the shift signals $S_4$ and $S_2$ are both change to "0" and the shift $s_1$ changes to "1" level, a carry bit Ca is inserted to the data applied to the selector 15a through the AND gate 21. Further, the output terminals through which no shifted data $D_0$ to $D_7$ and no carry bit Ca are outputted are all set to "0" level.

On the other hand, the rotate section includes two selectors 25 and 27 (having the same function as those of the selectors 11a to 15b) and 8 OR gates 29, in order to implement a carry-excluding rotation operation and a carry-including rotation operation for the shifted data outputted from the shift section.

In carry-excluding rotation operation, the rotate section shown in FIG. 2 finds logical sums of outputs OUT 8 to OUT 15 and outputs OUT 0 to OUT 7. In more detail, these are logical sums of OUT 0 and OUT 8, out 1 and OUT 9, OUT 2 and OUT 10, --- and OUT 7 and OUT 15.

In carry-including rotation operation, the rotate section finds logical sums of outputs OUT 9 to OUT 16 (GND) and OUT 0 to OUT 7. In more detail, these are logical sums of OUT 0 and OUT 9, OUT 1 and OUT 10, OUT 2 and OUT 11, --- OUT 7 and OUT 16 (GND level). Further, the input data applied to OUT 8 is directly applied to a carry flip-flop Ca F/F.

Figure 3:
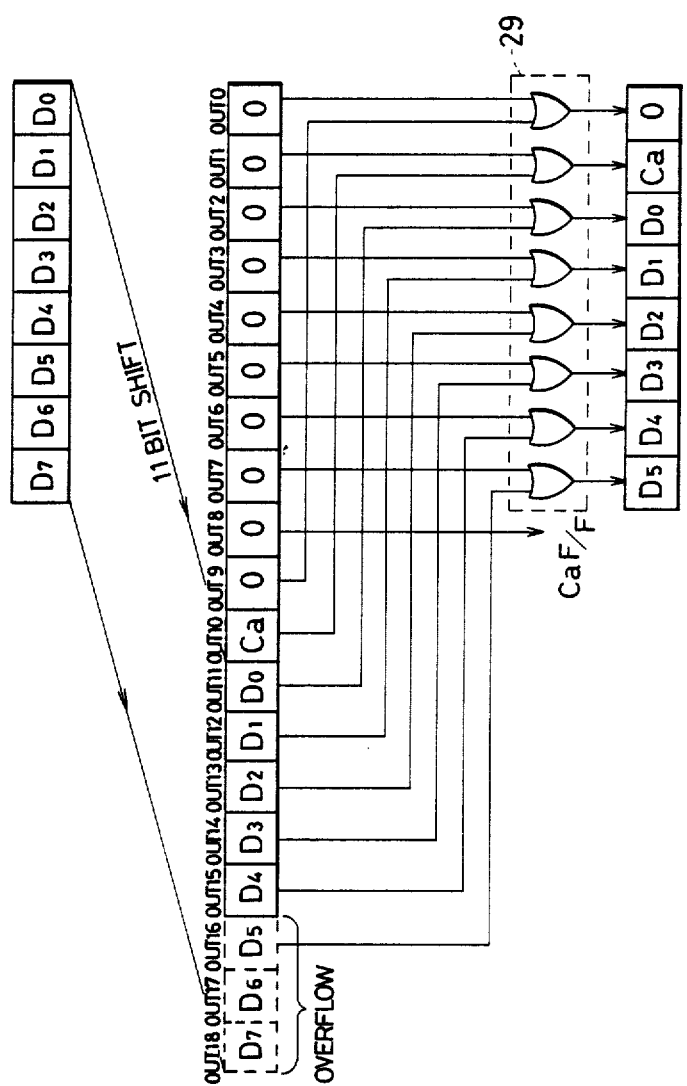
FIG. 3 is an illustration for assistance in explaining a carry-including rotation operation.

In the above operations, the carry-excluding rotation operation is implemented when the rotate signal R is set to "1" level; the carry-including rotation operation is implemented when the carry-including rotate signal CR is set to "1" level. In both the operations, the above-mentioned logical sum calculations of two of these output terminals are effected through the OR gate 29. By the way, in the barrel shifter as configured above, when a 32-bit input data, for instance is rotated, since the input data can be shifted by 31 bits at its maximum, five shift signals of $S_{16}$, $S_8$, $S_4$, $S_2$ and $S_1$ are required to designate the amount of shift (referred to as shift count) of 16 bits, 8 bits, 4 bits, 2 bits and 1 bit, respectively. In this, barrel shifter, if an 8-bit input data and a carry Ca are given and further a shift count of 9 bits or more is designated as when a 11-bit shift count is designated, it is impossible to implement a carry-including rotation operation because these data bits $D_7$, $D_6$, $D_5$ overflow, as depicted in FIG. 3. That is, in general, it is impossible to implement a carry-excluding rotation operation or a carry-including rotation operation, in response to the shift signals corresponding to a shift count, when an input data of N-bit length or less is given to an N-bit barrel shifter and additionally a shift count of N-bit length or more is instructed.

This is because in a rotation operation, an input data should be repeated periodically according to the bit length of the input data, irrespective of the amount of rotate (referred to as rotate count). That is, in the rotation operation of an N-bit length input information, the rotated data is the same whenever the input data is rotated. In other words, if the rotate count is designated as x, a remainder of a division (x/N) of rotate count x by bit length N is an actual shift count or rotate count in the rotation operation of an N-bit input data. The above remainder of x/N is referred to as modulo x/N. In this connection, modulo implies an arithmetic operation such that the operation result is a remainder obtained when a first operand is divided by a second operand as (dividend)/(divisor)=(quotient)+(remainder). That is, 27 modulo 4=3., for instance.

For instance, in order to implement a rotation operation by shifting an 8-bit input data by use of a barrel shifter which can shift an input data up to 31 bits at its maximum in response to 5 shift signals of $S_{16}$, $S_8$, $S_4$, $S_2$, and $S_1$, the shift count becomes a remainder of a rotate count divided by the bit length (N=8). This remainder is any one of 0 to 7, and can be expressed on the basis of three shift signals $S_4$, $S_2$ and $S_1$ with the two shift signals $S_{16}$ and $S_8$ being masked as "0". If the rotate count is 19 bits, for instance, this remainder is 19/8=3, so that the actual shift count is 30 bits. Therefore, in order to rotate a 19 bit input data by 3 bits, although the shift signals $S_{16}$, $S_8$, $S_4$, $S_2$ and $S_1$ are (10011), since the shift signals $S_{16}$ and $S_8$ are masked as "0", the shift signals of $S_{16}$ to $S_1$ =(−00011) is given to the barrel shifter as an instruction of a 3-bit shift count.

As described above, the shift signals $S_{16}$ to $S_1$ can be listed according to the bit length (N) and the shift count (modulo x/N) of an input data to be rotated, as shown in FIG. 4. Further, in FIG. 4, a digit of "1" or "0" is set at positions indicated by marks* according to the shift count, while marks 0 indicate that the shift signals are masked as "0".

By the way, in an N-bit barrel shifter, when an input data of an N-bit or less bit length is rotated together with a carry bit by an N-bit or more rotate count, it is impossible to implement the carry-including rotation operation by only masking the shift signals on the basis of the modulo x/N or the remainder of rotate count divided by input data bit length N as shown in FIG. 4. This is because the actual shift count changes from modulo x/N to modulo x/N+1, because a carry bit is added to the N-bit input data.

For instance, when an 8-bit input data is rotated with a carry, if the rotate count is 13 bits, the modulo x/N+1 =13/8+1 is 4. This indicates that the rotated data of 13-bit rotate count is equal to that of 4-bit rotate count, that is, an 8-bit input data can be carry-rotated by 13 bits by shifting the input data by 4 bits in the barrel shifter.

However, where the rotate count is 13 bits (8+4+1), the shift signals $S_{16}$ to $S_1$ are (01101). Therefore, if the shift signals $S_{16}$ to $S_1$ are determined as (00101) by masking the shift signals $S_{16}$ and $S_8$ as "0", the input information is shifted by 5 bits, so that it is impossible to implement the carry-including rotation operation of 4 bit rotate count, by simply masking some of the shift signals. In other word, it is impossible to obtain an actual rotate count (modulo x/N+1=4 bits) by simply masking some shift signals of an instructed rotate count (x=13 bits) in the case when an N-bit or less is rotated with carry bit by an N-bit or more rotate count.

This indicates that in an N-bit barrel shifter, when an input data of an N-bit or less bit length is rotated (e.g. N=8 bits), the barrel shifter can designate only a rotate count of 0 to 7 bits, thus rotate count being limited according to the bit length of the input data.

Figure 5:
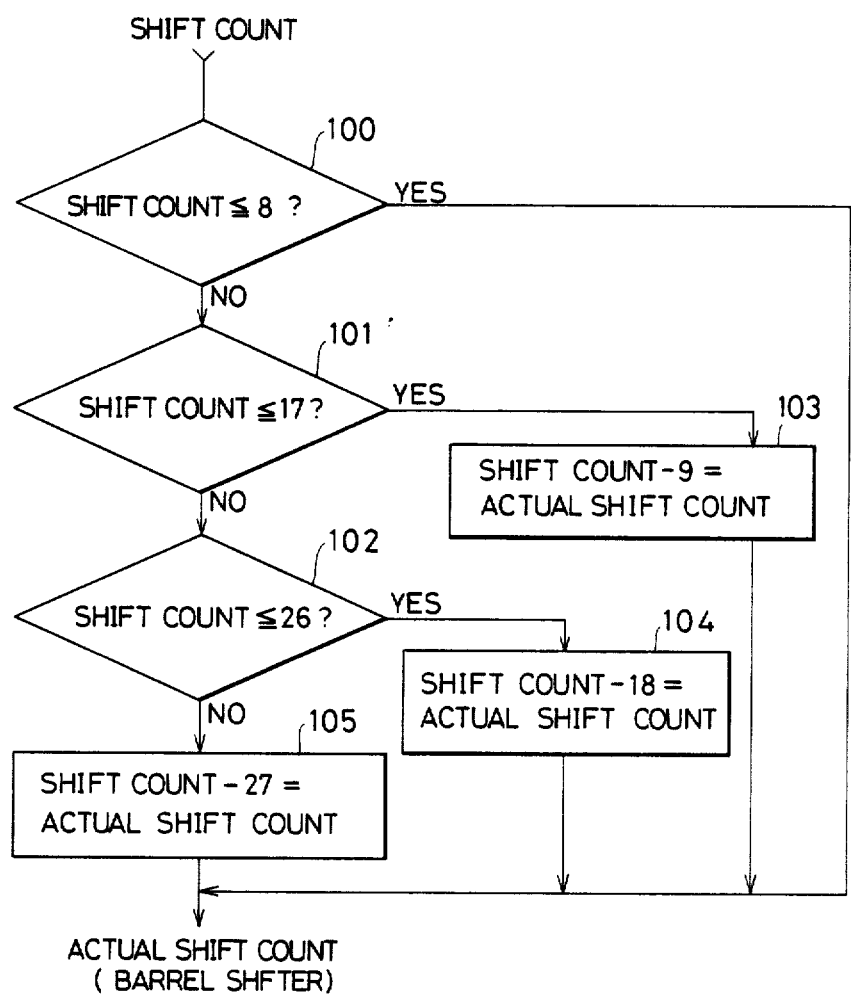
FIG. 5 is a flowchart for calculating the amount of shift in accordance with software processing.

To obviate the limitation of the above-mentioned rotate count, it is necessary to change the modulo x/N or the remainder into the modulo x/N+1 by dividing (the rotate count N) by (input data bit length N+1) in accordance with software 5, as follows:

FIG. 5 shows a flowchart for determining an actual shift count required to implement 8-bit data carry-including rotation operation in a 32-bit barrel shifter. In this flowchart, an amount of shift (shift count) is first determined (in steps 100, 101, and 102). If the shift count ≦8=, this shift count is directly given to the barrel shifter as an actual shift count. If 9≦ =shift count ≦17=, 9 is subtracted from the shift count (step 103); if 18≦ =shift count ≦26=, 18 is subtracted from the shift count (step 104); if 27≦ =shift count, 27 is subtracted from the shift count (step 105). Each of these subtraction results is given to the barrel shifter as an actual shift count. As explained above, where the shift count is 27 bits or more, since the shift count is determined in accordance with software, it takes much time because 5 steps or more should be executed.

As described above, in a barrel shifter for shifting an N-bit input data, the amount of rotate (rotate count) is restricted when an input information of N-bit or less is rotated with a carry. Further, in order to implement a rotation operation of an input data bit length or more without limitation in rotate count, it has been necessary to calculate a shift count actually given to the barrel shifter. If the actual shift count is calculated in accordance with software, there exists a problem in that a long calculation time is necessary.

In other words, it takes much time to calculate the shift count (even if the shift operation is implemented at a high speed), and therefore the rotate operation speed is lowered when the actual shift count is calculated by software in the carry-including rotation operation.

In view of the above-description, reference is now made to the gist of the present invention.

Figure 6:
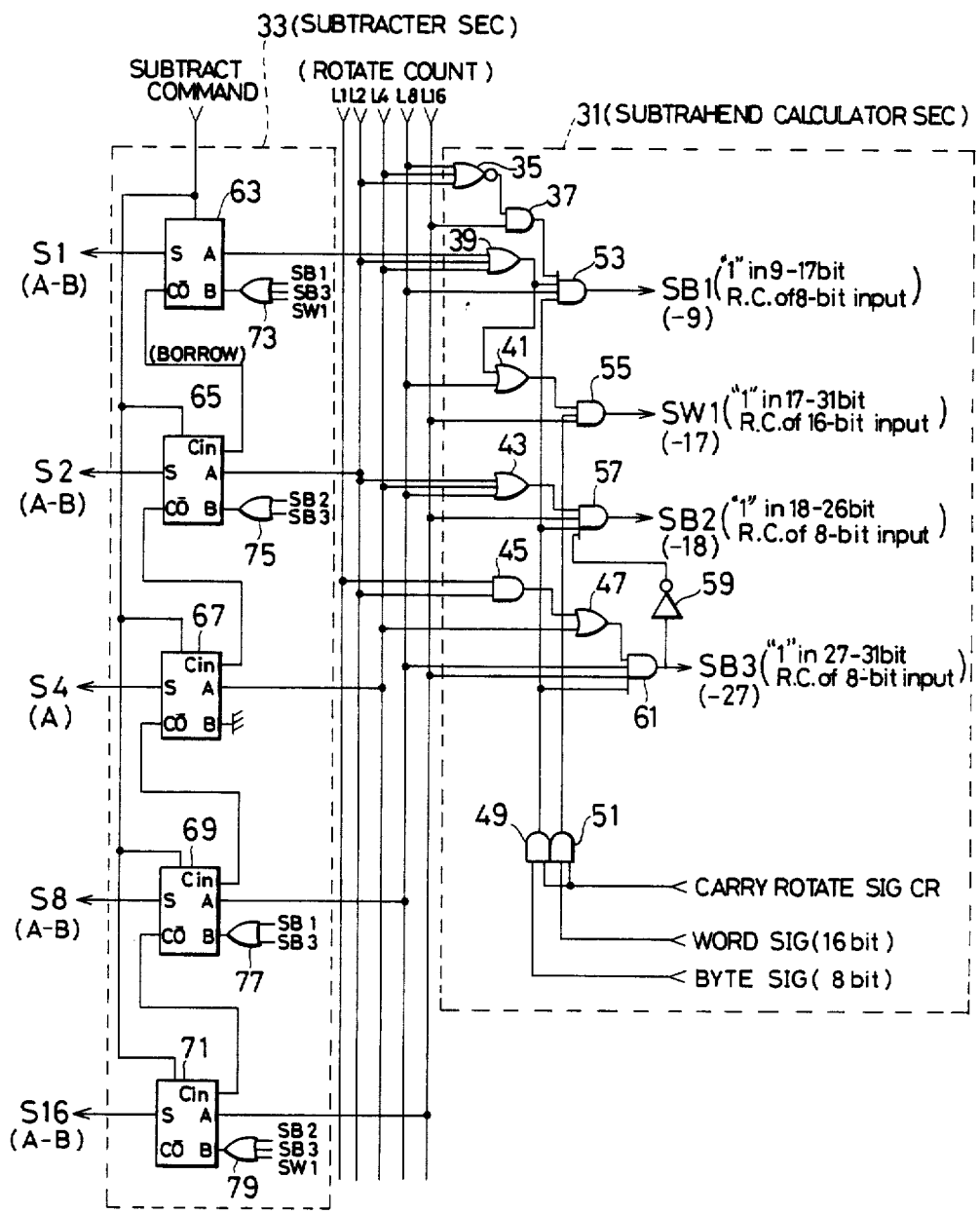
FIG. 6 is a schematic block diagram showing an embodiment of a shift count calculating section of the barrel shifter according to the present invention.

FIG. 6 is a block diagram of a shift count calculating section incorporated in a barrel shifter according to the present invention. This shift count calculating section supplies five shift signals of $S_1$, $S_2$, $S_4$, $S_8$ and $S_{16}$ (indicative of shift count) to a barrel shifter for shifting a 32-bit input data, which is configured in the same way as shown in FIG. 1.

In the barrel shifter thus configured, since the input data can be shifted up to 31 bits, the five shift signals are needed in total. The shift signal $S_{16}$ designates a 16-bit shift count; $S_8$ designates a 8-bit shift count; $S_4$ designates a 4-bit shift count; $S_2$ designates a 2-bit shift count; and $S_1$ designate a 1-bit shift count, respectively. In combination of these five shift signals, it is possible to shift an input data from 0 to 31 bits.

Further, the shift count calculating section shown in FIG. 6 serves to supply shift signals to the 32-bit barrel shifter so that when a 8- or 16-bit input data is given, the barrel shifter can implement a carry-including rotation operation of a rotate count more than the above input data bit length (8 or 16 bits).

In FIG. 6, the shift count calculating section comprises a subtrahend calculating section 31 and a subtracter section 33. The subtrahend calculating section 31 compares a rotate count given through rotate count indication lines $L_1$ to $L_{16}$ with an input data bit length, and outputs subtrahend signals $SB_1$, $SB_2$, $SB_3$ and $SW_1$ according to the bit length of an input data, when the rotate count exceeds the bit length (rotate count>input data bit length +1). The subtracter section 33 subtracts a subtrahend (determined in response to the detection signals outputted from this subtrahend calculating section 31) from the rotate count given through the rotate count indicating lines $L_1$ to $L_{16}$, and outputs shift signals $S_1$ to $S_{16}$.

In more detail, the rotate count given through the rotate count indicating lines $L_1$ to $L_{16}$ is represented by a BCD (binary coded decimal rotation) code. The rotate count indicating line $L_1$ represents a 1-bit rotate count; $L_2$ represents a 2-bit rotate count; $L$ represents a 4-bit rotate count; $L_8$ represents a 8-bit rotate count; and $L_{16}$ represents a 16-bit rotate count, respectively.

The subtrahend calculating section 31 is composed of an inverter, AND gates, OR gates, and a NOR gate.

Three input terminals of the NOR gate 35 are connected to the rotate count indicating lines $L_2$, $L_4$ and $L_8$, respectively. One input terminal of the AND gate 37 is connected to an output terminal of the NOR gate 35 and the other input terminal thereof is connected to the rotate count indicating line $L_{16}$. Three input terminals of the OR gate 39 are connected to the rotate count indicating lines $L_1$, $L_2$ and $L_4$, respectively. One input terminal of the OR gate 41 is connected to the rotate count indicating line $L_8$ and the other input terminal thereof is connected to an output terminal of the OR gate 39. Three input terminals of the OR gate 43 are connected to the rotate count indicating lines $L_2$, $L_4$ and $L_8$ respectively. Two input terminals of the AND gate 45 are connected to the rotate count indicating lines $L_1$ and $L_2$. One input terminal of the OR gate 47 is connected to an output terminal of the AND gate 45 and the other input terminal thereof is connected to the rotate count indicating line $L_4$ A byte signal indicative of an 8-bit input data is given to one input terminal of the AND gate 49, and a carry rotate signal CR is given to the other input terminal thereof (49). A word signal indicative of a 16-bit input data is given to one input terminal of the AND gate 51, and the carry rotate signal CR is given to the other input terminal thereof.

Each of input terminals of the AND gate 53 is connected to each output terminal of the AND gate 37, the OR gate 39 and the AND gate 49 and the rotate count indicating line $L_8$ in order to output a detection signal $SB_1$ from the output terminal thereof (53). This detection signal $SB_1$ changes to "1" level when rotate counts of 9 to 17 bits are given to the rotate count indicating lines $L_1$ to $L_{16}$ in a carry-including rotation operation of an 8-bit input data.

Each of input terminals of the AND gate 55 is connected to each output terminal of the OR gate 41 and the AND gate 51 and the rotate count indicating line L16, in order to output a detection signal $SW_1$ from the output terminal thereof (55). This detection signal $SW_1$ changes to "1" level when rotate counts of 17 to 31 bits are given to the rotate count indicating lines $L_1$ to $L_{16}$ in a carry-including rotation operation of a 16-bit input information.

Each of input terminals of the AND gate $S_7$ is connected to each output terminal of the OR gate 43, the ND gate 49 and the inverter 59 and the rotate count indicating line $L_{16}$, in order to output a detection signal $SB_2$ from the output terminal thereof (57). This detection signal $SB_2$ changes to "1" level when rotate counts of 18 to 26 bits are given to the rotate count indicating lines $L_1$ to $L_{16}$ in a carry-including rotation operation of an 8-bit input data.

Each of input terminals of the AND gate 61 is connected to each output terminal of the OR gate 47, the AND gate 49 and the rotate count indicating lines $L_8$ and $L_{16}$, in order to output a detection signal $SB_3$ from the output terminal thereof (61). Further, the output terminal of this AND gate 61 is connected to an input terminal of the inverter 59. This detection signal $SB_3$ changes to "1" level when rotate counts of 27 to 31 bits are given to the rotate count indicating lines $L_1$ to $L_{16}$ in a carry-including rotation operation of an 8-bit input data.

The subtracter section 33 is composed of five subtracters and four OR gates. In response to a subtract command, each of the subtracters 63, 65, 67, 69 and 71 subtracts a subtrahend determined according to the detection signals $SB_1$, $SB_2$, $SB_3$ and $SW_1$ (including a borrow) given to a borrow input terminal B from a rotate count given to one input terminal A through the rotate count indicating lines $L_1$ to $L_{16}$. The subtracted data is outputted from the output terminal S, and a borrow produced in subtraction is outputted from a borrow output terminal Co. Further, when no subtraction signal is given, each of these subtracters 63, 65, 67, 69 and 71 outputs a rotate count given to the input terminal A as it is through the output terminal S.

An input terminal A of the subtracter 63 is connected to the rotate count indicating line $L_1$ and an input terminal B thereof is connected to the output terminal of the OR gate 73, to the input terminals of which the detection signals $SB_1$, $SB_3$ and $SW_1$ are given, in order to output a shift signal $S_1$ from the output terminal S thereof (63).

An input terminal A of the subtracter 65 is connected to the rotate count indicating line $L_2$ and an input terminal B thereof is connected to the output terminal of the OR gate 75, to the input terminal of which the detection signals $SB_2$ and $SB_3$ are given, in order to output a shift signal $S_2$ from the output terminal S thereof (65).

An input terminal A of the subtracter 67 is connected to the rotate count indicating line $L_4$ and an input terminal B thereof is connected to the ground, in order to output a shift signal $S_4$ from the output terminal S thereof (67).

An input terminal A of the subtracter 69 is connected to the rotate count indicating line $L_8$ and an input terminal B thereof is connected to the output terminal of the OR gate 77, to the input terminal of which the detection signals $SB_1$ and $SB_3$ are given, in order to output a shift signal $S_8$ from the output terminal S thereof (69).

An input terminal A of the subtracter 71 is connected to the rotate count indicating line $L_{16}$ and an input terminal B thereof is connected to the output terminal of the OR gate 79, to the input terminal of which the detection signals $SB_2$, $SB_3$ and $SW_1$ are given, in order to output a shift signal $S_{16}$ from the output terminal thereof (71).

When the detection signal $SB_1$ changes to "1" level, since this signal $SB_1$ is applied to the subtracter 63 for $S_1$ ($2^0$) and the subtracter 69 for $S_8$ ($2^3$), 9 is subtracted from the rotate count applied to the rotate count indicating lines $L_1$ to $L_{16}$. Further, this $SB_1$ signal changes to "1" level when the rotate count is 9 to 17 bits and a byte signal is at "1" level.

When the detection signal $SB_2$ changes to "1" level, since $SB_2$ is applied to the subtracter 65 for $S_2$ ($2^1$) subtracter 71 for $S_{16}$ ($2^4$), 17 is subtracted from the rotate count applied to $L_1$ to $L_{16}$. Further, this $SB_2$ signal changes to "1" level when the rotate count is 18 to 26 bits and a byte signal is at "1" level.

When the detection signal $SB_3$ changes to "1" level, since $SB_3$ is applied to the subtracter 63 for $S_1$ ($2^0$), the subtracter 65 for $S_2$ ($2^1$), the subtracter 69 for $S_8$ ($2^3$) and the subtracter 71 for $S_{16}$ ($2^4$), 7 is subtracted from the rotate count applied to $L_1$ to $L_{16}$. Further, this $SB_3$ signal changes to "1" level when the rotate count is 27 to 31 bits and a byte signal is at "1" level.

When the detection signal $SW_1$ changes to "1" level, since $SW_1$ is applied to the subtracter 63 for $S_1$ ($2^0$) and the subtracter 71 for $S_{16}$ ($2^4$), 7 is subtracted from the rotate count applied to $L_1$ to $L_{16}$. Further, this $SW_1$ signal changes to "1" level when the rotate count is 17 to 31 bits and a word signal is at "1" level.

The operation of the shift count calculating section shown in FIG. 6 will be described with reference to FIG. 7. When a barrel shifter for shifting a 32-bit input data implements a carry-including rotation operation of an 8-bit input data, the divisor (N+1) is 9 because the input data is N=8 in bit number. Therefore, the actual shift count given to the barrel shifter is determined by a remainder obtained when the rotate count x is divided by 9 (i.e. modulo x/N+1). This remainder can be calculated by subtracting a subtrahend (determined according to a rotate count) from the rotate count. The subtrahend is 9 if the rotate count is 9 to 17 bits, 18 if 18 to 26 bits, and 27 if 27 to 31 bits as listed in FIG. 7.

In the case of the carry-including rotation operation of an 8-bit input data, the byte signal and the carry rotate signal CR are both at "1" level.

When a rotate count of 0 to 8 bits is given to the subtrahend calculator section 31 through the rotate count indicating lines $L_1$ to $L_{16}$, all the detection signals $SB_1$, $SB_2$, $SB_3$ and $SW_3$ are set to "0" level. Therefore, the subtracter section 33 outputs a rotate count given to the rotate count indicating lines $L_1$ to $L_{16}$ as it is, without executing a subtraction operation, as the shift signals $S_1$ to $S_{16}$.

When a rotate count of 9 to 17 bits is given to the subtrahend calculator section 31 through the rotate count indicating lines $L_1$ to $L_{16}$, the detection signal $SB_1$ is set to "1" level and supplied to the input terminals B of the subtracters 63 and 69. Accordingly, a subtrahend 9 (01001) is subtracted from a given rotate count of 9 to 17 bits in the subtracter section 33, and the subtracted result (difference) (0 to 8) becomes a shift count actually given to the barrel shifter as shift signals $S_1$ to $S_{16}$. When a rotate count of 18 to 26 bits is given to the subtrahend calculator section 31 through the rotate count indicating lines $L_1$ to $L_{16}$, the detection signal $SB_2$ is set to "1" level and supplied to the input terminals B of the subtracters 65 and 71. Accordingly, a subtrahend 18 (10010) is subtracted from a given rotate count of 18 to 26 bits in the subtracter section 33, and the subtracted result (difference) (0 to 8) becomes a shift count actually given to the barrel shifter as shift signals $S_1$ to $S_{16}$.

When a rotate count of 27 to 31 bits is given to the subtrahend calculator section 31 through the rotate count indicating lines $L_1$ to $L_{16}$, the detection signal $SB_3$ is set to "1" level and supplied to the input terminals B of the subtracters 63, 65, 69 and 71. Accordingly, a subtrahend 27 (11011) is subtracted from a given rotate count of 27 to 31 bits in the subtracter section 33, and the subtracted result (0 to 8) becomes a shift count actually given to the barrel shifter as shift signals $S_1$ to $S_{16}$.

When the barrel shifter implements a carry-including rotation operation of a 16-bit input information, the divisor (N+1) is 17 because the input data is of 16 (N) bits. Therefore, the actual shift count given to the barrel shifter is determined by a remainder obtained when the rotate count is divided by 17 (i.e. modulo x/N+1). This remainder can be calculated by subtracting a subtrahend (determined according to a rotate count) from the rotate count. The subtrahend is 17 if the rotate count is 17 to 31 bits as listed in FIG. 7.

In the case of the carry-including rotation operation of a 16-bit input data, the word signal and the carry rotate signal CR are both at "1" level.

When a rotate count of 0 to 16 bits is given to the subtrahend calculator section 31 through the rotate count indicating lines $L_1$ to $L_{16}$, all the detection signals $SB_1$, $SB_2$, $SB_3$ and $SW_3$ are set to "0" level. Therefore, the subtracter section 33 outputs a rotate count given to the rotate count indicating lines $L_1$ to $L_{16}$ as it is, without executing a subtraction operation, as the shift signals $S_1$ to $S_{16}$.

When a rotate count of 17 to 31 bits is given to the subtrahend calculator section 31 through the rotate count indicating lines $L_1$ to $L_{16}$, the detection signal $SW_1$ is set to "1" level and supplied to the input terminals B of the subtracters 63 and 69. Accordingly, a subtrahend 17 (10001) is subtracted from a given rotate count of 17 to 31 bits in the subtracter section 33, and the subtracted result (difference) (0 to 14) becomes a shift count actually given to the barrel shifter as shift signals $S_1$ to $S_{16}$.

When an input data is of 32 bit, since the byte signal and the word signal are both "0" level, all the detection signals $SB_1$, $SB_2$, $SB_3$ and $SW_1$ are set to "0" level irrespective of the rotate count, and further no subtraction signal is supplied to the subtracter section 33. Therefore, a rotate count given to the rotate count indicating lines $L_1$ to $L_{16}$ are supplied to the barrel shifter as they are as shift signals $S_1$ to $S_{16}$.

Further, in the case of a carry-excluding rotation operation of an 8-, 16- or 32-bit input data, since the carry rotate signal CR is at "0" level, the detection signals and the subtraction signal are all set to "0" level, so that a rotate count given to the rotate count indicating lines $L_1$ to $L_{16}$ is supplied to the barrel shifter as it is as the shift signals $S_1$ to $S_{16}$.

In summary, in the carry-excluding rotation operation, the shift signal should be determined by obtaining a modulo x/N or a remainder obtained by dividing a shift count x by a divisor N (where N denotes a bit length of an input data), so that the shift signals can be obtained by simply masking some shift signals. However, in the carry-including rotation operation, the shift signal should be determined by obtaining a modulo x/N+1 or a remainder obtained by dividing a shift count x by a divisor N+1, so that the shift signals will not be obtained by simply masking some shift signals but the above modulo x/N+1 should be calculated as listed in FIG. 7.

In the case of an 8-bit input data, since the divisor N+1 is 9, the actual shift count is a modulo or remainder of x/9 (where x denotes a rotate count). Therefore, when x is 0 to 8 bits, the remainder is 0 and the subtrahend is 0; when x is 9 to 17 bits, the remainder is 0 to 8 bits and the subtrahend is 9; when x is 18 to 26 bits, the remainder is 0 to 8 bits and the subtrahend is 18; when x is 27 to 31 bits, the remainder is 0 to 4 bits and the subtrahend is 27 bits, as listed in FIG. 7.

In the case of an 16-bit input data, since the divisor N+1 is 17, the actual shift count is a modulo or remainder of x/17 (where x denotes a rotate count). Therefore, when x is 0 to 16 bits, the remainder is 0 and the subtrahend is 0; when x is 17 to 31 bits, the remainder is 0 to 14 bits and the subtrahend is 17, as listed in FIG. 7.

Subtrahend signals $SB_1$ (−9 bits) $SB_2$ (−18 bits), $SB_3$ (−27 bits) and $SW_1$ (−17 bits for 16 bit input data) are selectively applied to subtracters 63, 65, 69 and 71 to subtract the subtrahends of i-times of divisor (N+1) (where i=0, 1, 2, ...).

As described above, in the barrel shifter for processing a 32-bit input data according to the present invention, since the carry-including rotation operation of an 8- or 16-bit input data can be implemented by calculating the shift count given to the barrel shifter according to the input data bit length N and the rotate count x by means of hardware without being dependent upon softwave, when the rotate count (e.g. 9 to 31 bits) exceeds the input data bit length (e.g. 8 or 16 bits), it is possible to calculate the shift count at high speed.

What is claimed is:

1. A barrel shifter comprising:
   (a) shifting means for selectively shifting an N-bit input data by a given shift count in response to a plurality of shift signals indicative of a shift count in combination and outputting a 2N-bit output data;
   (b) ANDing means connected to said shifting means for ANDing a carry signal and a carry rotate signal to insert a carry bit behind a least significant bit position of the shifted N-bit output in cooperation with the shift signals;
   (c) ORing means connected to said shifting means for finding logical sums of each of N lower significant bits of the same in response to a rotate signal to obtain an N-bit rotated data without carry and logical sums of each of N lower significant bits of the 2N-bit output data and each of (N−1) higher significant bits of the same in response to a carry rotate signal to obtain an N-bit rotated data with carry; and
   (d) calculating means connected to said shifting means for calculating an actual shift count in accordance with a formula of x-(N+1)(i)(i=0, 1, 2, ... where x denotes a rotate count and N denotes an input data bit length, when the rotate count x is more than the input data bit length N, and for outputting the calculated shift signals to said shifting means to rotate the N-bit data with carry by a rotate count more than the input data bit length N.

2. The barrel shifter as et forth in claim 1, wherein said calculating means generates shift signals on the basis of a rotate count without calculation in carry-excluding rotation operation or in carry-including rotation operation of when an N-bit data is rotated with carry by a rotate count less than the input data bit length N.

3. The barrel shifter as set forth in claim 1, wherein said calculating means comprises:
   (a) subtrahend calculating means for calculating a subtrahend on the basis of a rotate count and in response to a carry rotate signal and an input data bit length signal; and
   (b) subtracting means for subtracting the calculated subtrahend from the rotate count and for outputting shift signals corresponding to the calculated subtrahend.

4. The barrel shifter as set forth in claim 3, wherein the signals indicative of an input data bit length is a byte signal of 8 bits and a word signal of 16 bits.

5. The barrel shifter as set forth in claim 4, wherein said calculating means comprises:
   (a) first ANDing means (53) for finding an AND product of the carry rotate signal, an 8-bit byte signal and 9 to 17 bit rotate count signals to output a subtract signal $SB_1$ indicative of a subtrahend of (−9);
   (b) second ANDing (57) means for finding an AND product of the carry rotate signal, the 8-bit byte signal and 18 to 26 bit rotate count signals to output a subtract signal $SB_2$. indicative of a subtrahend of (−18);
   (c) third ANDing means (61) for finding an AND product of the carry rotate signal, the 8-bit byte signal, and 27 to 31 bit rotate count signals to output a subtract signal $SB_3$ indicative of a subtrahend of (−27), and
   (d) fourth ANDing means (55) for finding an AND product of the carry rotate signal, a 16-bit word signal and 17 to 31 bit rotate count signals to output a subtract signal $SW_1$ indicative of a subtrahend of (−17).

6. The barrel shifter as set forth in claim 5, wherein said subtracting means comprises:
   (a) a first subtracter (63) connected to a first least significant bit rotate count line for subtracting one bit therefrom in response to the subtract signals $SB_1$, $SB_3$ and $SW_1$ to output a borrow signal and a first shift signal $S_1$;
   (b) a second subtracter (65) connected to a second significant bit rotate count line for subtracting one bit therefrom in response to the subtract signals $SB_2$ and $SB_3$ to output a borrow signal and a second shift signal $S_2$;
   (c) a third subtracter (67) connected to a third significant bit rotate count line for subtracting no bit therefrom to output a borrow signal and a third shift signal $S_4$;
   (d) a fourth subtracter (69) connected to a fourth significant bit rotate count line for subtracting one bit therefrom in response to the subtract signals $SB_1$ and $SB_3$ to output a borrow signal and a fourth shift signal $S_8$; and
   (e) a fifth subtracter (71) connected to a fifth most significant bit rotate count line for subtracting one bit therefrom in response to the subtract signal $SB_2$, $SB_3$ and $SW_1$ to output a fifth shift signal $S_{16}$.

7. A method of rotating an input data with a bit length of 8 or 16 bits together with a carry bit by a rotate count more than 8 or 16 bits in a 32-bit barrel shifter, wherein an actual rotate count is determined by calculating a remainder of a division x/N+1, where x denotes a rotate count and N denotes an input data bit length, in accordance with the following steps of:
   (a) finding an AND product of a carry rotate signal, an 8-bit byte signal and 9 to 17 bit rotate count signals to generate a subtract signal $SB_1$ indicative of a subtrahend of (−9);
   (b) finding an AND product of the carry rotate signal, the 8-bit byte signal and 18 to 26 bit rotate count signals to generate a subtract signal $SB_2$ indicative of a subtrahend of (−18);
   (c) finding an AND product of the carry rotate signal, the 8-bit byte signal and 27 to 31 bit rotate count signals to generate a subtract signal $SB_3$ indicative of a subtrahend of (−27);
   (d) finding an AND product of the carry rotate signal, a 16-bit word signal and 17 to 31 bit rotate count signals to generate a subtract signal $SW_1$ indicative of a subtrahend of (−17); and
   (e) subtracting a subtrahend indicated by the subtract signals $SB_1$, $SB_2$, and $SB_3$, from a 9 to 31 bit rotate count and a subtrahend indicated by the subtract signal $SW_1$ from a 17 to 31 bit rotate count to obtain the actual rotate count.

* * * * *